United States Patent [19]

Lacroix et al.

[11] Patent Number: 4,768,202

[45] Date of Patent: Aug. 30, 1988

[54] SIGNALLING METHOD AND DEVICE FOR BIDIRECTIONAL DIGITAL TRANSMISSION LINK

[75] Inventors: Jean-Claude Lacroix, Bruyeres le Chatel; Pierre Franco, Fresnes; Stéphane Le Gall, Sceaux; Gérard Bourret, La Ville du Bois; Jacques Pochet, Le Plessis Paté, all of France

[73] Assignee: Alcatel, Paris, France

[21] Appl. No.: 849,331

[22] Filed: Apr. 8, 1986

[30] Foreign Application Priority Data

Apr. 19, 1985 [FR] France ................................ 85 05979

[51] Int. Cl.[4] .......................... H04B 17/02; H01J 9/38; G05B 23/02
[52] U.S. Cl. ..................................... 375/3.1; 370/13.1; 455/9; 455/601; 379/4; 379/26; 371/22; 178/71 T; 340/508; 340/825.06
[58] Field of Search ..................... 375/3, 3.1; 455/601, 455/8, 9; 379/4, 26, 5; 178/71 T, 71 R; 371/22; 370/13.1, 15; 340/825.05, 825.06, 825.16, 517, 505, 508

[56] References Cited

U.S. PATENT DOCUMENTS

| | | | |
|---|---|---|---|
| 4,266,183 | 5/1981 | Steensma et al. | 455/601 |
| 4,317,010 | 2/1982 | Fillot | 370/13.1 |
| 4,402,075 | 8/1983 | Bargeton et al. | 370/13.1 |
| 4,425,662 | 1/1984 | Jeandot | 371/22 |
| 4,635,260 | 1/1987 | Sestan | 371/22 |

FOREIGN PATENT DOCUMENTS 0033932 8/1981 European Pat. Off. .
2131657 6/1984 United Kingdom .

OTHER PUBLICATIONS

Patents Abstracts of Japan, vol. 4, No. 97 (E-18) (579), Jul. 12, 1980 & JP A-55 60 364 (Fujitsu KK) 7/5/80.

Primary Examiner—Robert L. Griffin
Assistant Examiner—Andrew J. Telesz, Jr.
Attorney, Agent, or Firm—Sughrue, Mion, Zinn, Macpeak and Seas

[57] ABSTRACT

A method of transmitting signalling along a bidirectional digital transmission link consists in transmitting from an intermediate equipment of the link a signalling message in two parts. One is a characterizing part the form of which depends on the signalling type and which is substituted for data of one of the digital bit streams carried by the link in the direction from one of the terminals referred to as the processing terminal. The other is a localizing part whose form is independent of the signalling type and which is substituted for data of the digital bit stream carried by the link in the direction towards the other, so-called relay terminal. The relay terminal responds by sending an acknowledgement message to the processing terminal, the time-delay of this relative to the characterizing part being used to identify the sending equipment. A signalling message transmission circuit controls switching circuits inserted into the paths of the digital bit streams carried by the link. The equipment for transmitting signalling along a bidirectional digital transmission link comprises a clock circuit defining in terms of the period of its output signal the duration of a signalling message characterizing part. Its half-period defines the duration of a localizing part. There is also a circuit for selecting the first complete period of the clock circuit output signal after a signalling transmission request, as well as circuits for composing the two parts of the message.

6 Claims, 3 Drawing Sheets

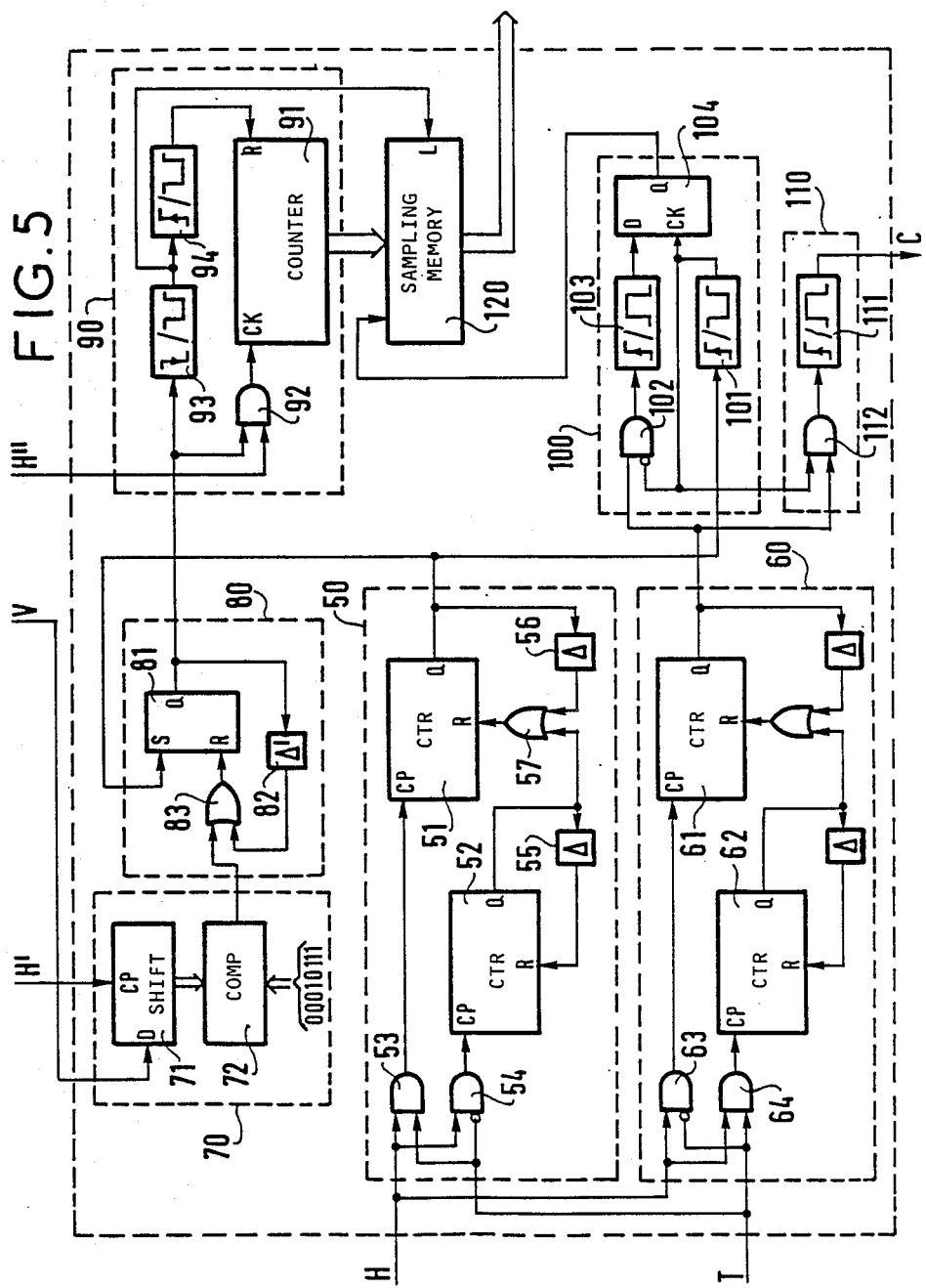

SIGNALLING METHOD AND DEVICE FOR BIDIRECTIONAL DIGITAL TRANSMISSION LINK

BACKGROUND OF THE INVENTION

1. Field of the Invention

The present invention relates to the remote surveillance of equipment located along a digital transmission link.

2. Description of the Prior Art

To meet the service life and reliability requirements for very long range transmission links it has seemed necessary to provide, in the context of fiber optic systems, some redundancy at the level of the laser diodes equipping the repeaters. Such redundancy achieved by equipping each repeater from the outset with a number of replacement laser diodes placed in service one by one by a switching circuit implies the existence of a system for remote controlling the switching circuits of the repeaters from the line terminal equipments and a system for transmitting signalling from each repeater to indicate to the terminal equipments the status of the laser diodes in service.

There is known from U.S. Pat. No. 4,281,416 a fiber optic digital link equipped with a remote control system for replacing in each repeater the laser diode in service by a spare laser diode and a signalling system specific to each repeater enabling an alarm to be transmitted as soon as the bias current of the laser diode in service passes a threshold. The remote control signal comprises a digital message of the same nature as the digital signal transmitted by the link and which is inserted into the traffic by the remote surveillance terminal. This digital message repeated a number of times in succession to eliminate misoperations is formed of a part identifying the repeater concerned and a part identifying in the repeater concerned the laser diode to be placed in service. The signalling signal is a pattern formed by a pseudo-random binary sequence the initial value of which identifies the source repeater.

This signalling system has the disadvantage of needing in each repeater a source of pseudo-random sequences operating at the data rate of the digital signal, meaning—in the context of optical fiber digital transmission—a very high data rate that can be achieved only using ECL technology of high power consumption. This significantly increases the power consumption of a repeater and above all its heat dissipation.

It also has the disadvantage of interrupting the link for long enough to cause loss of synchronization of the digital bit stream hierarchy so that it is only suitable for transmitting major alarms.

An object of the present invention is to alleviate these disadvantages and to achieve signalling by means of a message temporarily substituted for the data of the digital bit stream carried by the link which requires a minimum of very high speed circuits at the level of the circuits generating the message and which does not disturb the digital bit stream or the processing thereof outside the times for which the message is transmitted.

SUMMARY OF THE INVENTION

In one aspect, the present invention consists in a method of transmitting signalling along a bidirectional digital transmission link between two terminals, to a so-called processing terminal from a so-called relay terminal, using equipment distributed along the link and digital messages having the same data rate as the digital bit streams carried by the link, for the data in which they are temporarily substituted, wherein each signalling message is in two parts, a first, so-called characterizing part sent to the processing terminal and a second, so-called localizing part sent to the relay terminal which responds thereto by sending to the processing terminal an acknowledgement message received at the processing terminal with a time-delay relative to the characterizing part of the signalling message identifying the position along the link of the equipment sending the signalling message.

The bit pattern of the characterizing and localizing parts of a signalling message does not have to encode a number identifying the sending equipment, but only the types of signalling since the location of the sending equipment is deduced from the time-delay between receiving the characterizing part of the signalling message and receiving the acknowledgement message at the processing terminal. The encoding of the signalling types requires only limited variants in terms of bit patterns which, given their small number, may be chosen with the only constraint being to satisfy to the greatest extent possible the criterion that they should not be imitated by the digital bit streams carried by the link and should be easy to generate. The number of types of signalling is always small, not at all commensurate with the possible number of equipments, and may be precoded by the direction of the link adopted for transmitting the characterizing part of the signalling message, each terminal serving as the processing terminal for certain signalling types and the relay terminal for the others.

The localizing part of the message advantageously comprises a sequence of identical bits comprising slightly more bits than is authorized for the digital bit streams. The number of successive identical bits is always limited in a digital bit stream in order to avoid compromising the recovery of timing information. This limitation is chosen on the basis of repetition possibilities but may be exceeded without disadvantage for isolated messages such as these signalling messages. Where there is only one type of signalling to be identified these sequences are of no utility, of course.

The characterizing part of the message advantageously comprises successive bit sequences of which the first or so-called prefix is obtained by complementing the sequence of identical bits defining the localizing part and the others each reproduce the prefix sequence or its complement according to a code identifying the types of signalling. Where there is only one type of signalling to be identified, these sequences are of no utility, of course.

The acknowledgement message is advantageously carried by a service channel.

Loss of synchronization of the digital bit stream hierarchy on inserting the remote surveillance message is avoided by giving the characterizing and localizing parts of the remote surveillance message (and the acknowledgement message when it is not transmitted by a service channel but by temporarily substituting it for data of the digital bit stream) lengths significantly less than that of a sector of the highest frame of the digital bit stream hierarchy.

In another aspect, the invention consists in a device for implementing the aforementioned method.

Other characteristics and advantages of the invention will emerge from the following description of one embodiment thereof given by way of non-limiting example only with reference to the accompanying diagramatic drawings.

BRIEF DESCRIPTION OF THE DRAWINGS

FIG. 5 is a block diagram of one embodiment of the FIG. 4 signalling message processing equipment.

DESCRIPTION OF THE PREFERRED EMBODIMENT

The signalling system to be described is applied to a bidirectional digital transmission link comprising two separate fiber optic transmission lines 1 and 2 separately transmitting in the two directions at a data rate of 295.6 Mbit/s using a scrambled NRZ line code with a type 24 BIP parity bit. The digital bit streams in each transmission direction each comprise, by means of multiplexing organized into 4.736 $\mu$s frames subdivided into seven sectors, 64 kbit/s service channels and two 140 Mbit/s digital bit streams resulting from fourth order multiplexing according to a hierarchy conforming to CCITT Recommendation G.700.

Figure 1:
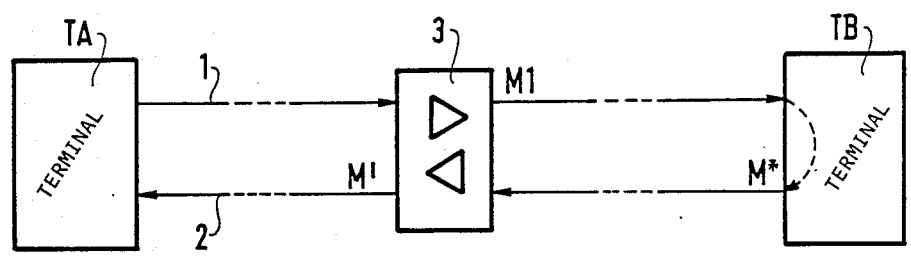
FIG. 1 is a schematic showing the principal components of a bidirectional digital link and explaining the paths of the two parts of a signalling message and the associated acknowledgement message.

FIG. 1 is a highly schematic representation of this link, with two terminals TA, TB linked by two parallel transmission lines, an upper line 1 for transmission in the direction from A to B and a lower line 2 for transmission in the direction from B to A, both equipped with intermediate regenerative repeaters 3 for regenerating the digital bit streams to preserve their intelligibility.

This link is equipped with a remote surveillance system comprising alarm detection and alarm management circuits in the regenerative repeaters 3 and a signalling system the equipments of which are divided between the terminals TA and TB and the regenerative repeaters 3, providing a way to send alarm signalling to the terminals from the regenerative repeaters and for localizing the regenerative repeaters 3 sending the signalling from the terminals TA and TB.

If an alarm management circuit of a regenerative repeater 3 requests to send a signalling message, a signalling transmission circuit in the regenerative repeater 3 in question briefly substitutes for the data of the digital bit stream carried by the upper transmission line 1 in the direction from A to B a first part M1 of a signalling message intended to localize the regenerative repeater 3 and substitutes for the data of the digital bit stream carried by the lower transmission line 2 in the direction from B to A a second part M' of the signalling message intended both to localize and to characterize the signalling.

The part M1 reaches terminal TB with a time-delay T2 corresponding to the time needed for the upper transmission line 1 to carry the digital bit stream from the regenerative repeater sending the signalling to the terminal TB, amounting to approximately 2000 $\mu$s per regenerative repeater involved in the case of the type of link used as an example.

Detected immediately it reaches terminal TB by a transponder, the part M1 of the signalling message causes an acknowledgement message M* to be generated and this is inserted after a processing time $\tau$ into a service channel on the lower transmission line 2 to the terminal TA.

The acknowledgement message M* reaches terminal TA after a time T2+T1 corresponding to the time needed for the transmission line 2 to convey it within a digital bit stream firstly to the regenerative repeater 3 sending the signalling and from there to the terminal TA. It reaches the latter at the end of a time-delay from transmission of part M1 equal to 2T2+$\tau$+T1.

The characterizing part M' sent directly to the terminal TA without passing through the terminal TB reaches it at the end of a time T1.

When a signalling message is sent by a regenerative repeater 3, the terminal TA receives a characterizing part identifying the type of signalling followed by an acknowledgment message M* arriving with a time-delay 2T2+$\tau$ relative to the characterizing part and localizing the regenerative repeater that sent it by its rank beginning from terminal TB.

The absence from the signalling message of a part identifying the sending regenerative repeater significantly reduces the quantity of information to be encoded by the binary states of the message itself, given that there may be more than 200 regenerative repeaters between the two terminal stations.

The roles of the terminals TA and TB may be interchanged. By choosing distinct characterizing and localizing parts, it is possible to have terminals TA and TB serve as processing terminals for certain signalling types and relay terminals for others. For preference, the terminal TA is taken as the processing terminal and the terminal TB as the relay terminal for all signalling concerning the parts of the regenerative repeaters 3 relating to the upper transmission line 1 and the terminal TB as the processing terminal and the terminal TA as the relay terminal for all signalling relating to the parts of the regenerative repeaters 3 relating to the lower transmission line 2.

In the present example, the localizing part M1 of a signalling message is a uniquely defined bit pattern formed by 75 consecutive zero bits and the characterizing part M' is a double length bit pattern beginning with a prefix corresponding to the complemented localizing part $\overline{M1}$ and ending with a suffix corresponding to the complemented or non-complemented localizing part $\overline{M1}$ or M1, which makes it possible to transmit two types of signalling.

One of the patterns comprising 75 identical zero or one bits is recognizable as it violates the definition of the 24 BIP code. In the context of an even parity bit, for example, which has the value zero for an even number of ones in a block, the pattern comrpises 75 identical one bits. Because scrambling is employed, the other configuration is extremely improbable in the digital bit streams. Both are easy to generate in the regenerative repeaters with a minimum of very high speed circuits since it is sufficient to impose a constant zero or one level at the inputs of their transmitters for 0.25 $\mu$s.

The acknowledgement message M* carried by a 64 kbit/s service channel has a specific configuration reserved to it in this service channel, for example that of the byte 00010111.

As the localizing part M1 and characterizing part M' are distinct bit patterns, it is possible to double the number of signalling types transmitted by assigning to the terminal TA the processing terminal role for certain signalling types and the relay terminal role for others. In the example described hereinafter, the terminal TA is used as the processing terminal for all signalling concerning the equipments of the regenerative repeaters assigned to the upper transmission line 1 (direction A to B) and the terminal TB as the processing terminal for all signalling concerning the equipments of the regenerative repeaters assigned to the lower transmission line 2 (direction B to A).

Figure 2:
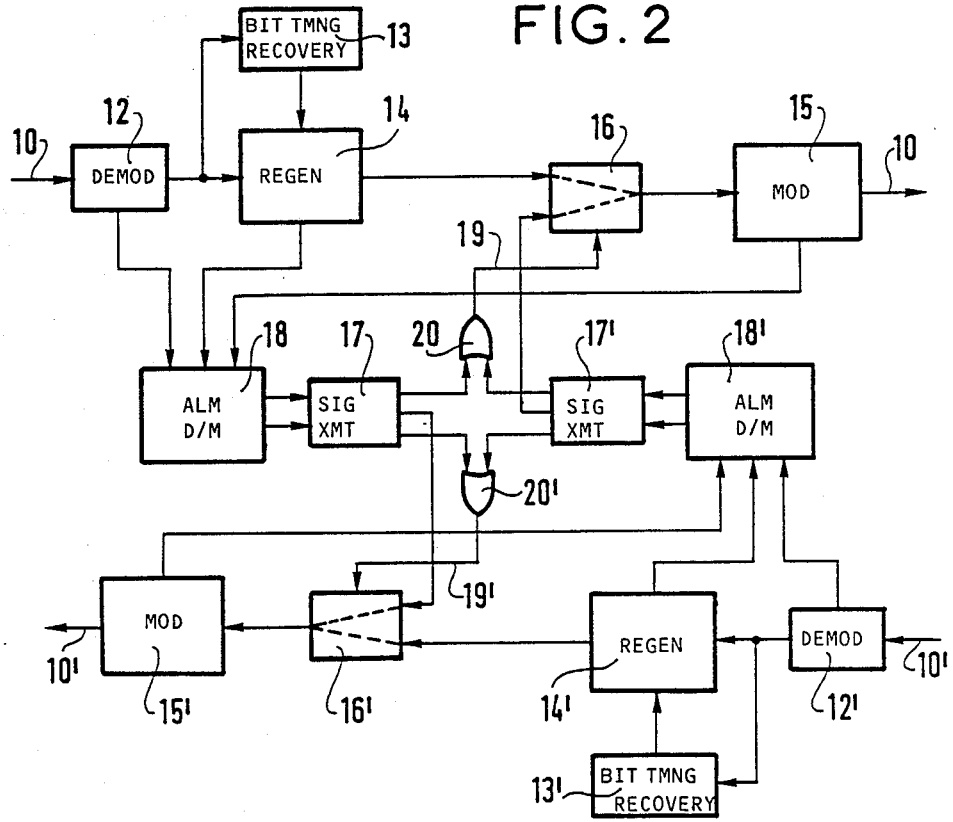
FIG. 2 schematically represents the layout of the circuits for transmitting signalling messages in a bidirectional repeater of the link of FIG. 1.

FIG. 2 is a schematic representation of a bidirectional regenerative repeater equipped with signalling message transmission circuits.

The regenerative repeater for the upper and lower optical fiber transmission lines 10 and 10' comprises, in the known manner and for each transmission direction, an opto-electrical demodulator 12, 12' receiving the optical signal to be regenerated from the optical fiber 10, 10', electronic circuits for reshaping the signal on the output side of the demodulator and essentially comprising a bit timing recovery circuit 13, 13' and a regenerator circuit 14, 14', and an optical modulator 15, 15' which receives the regenerated signal in electrical form and re-inserts it in optical form into the fiber 10, 10'.

It also comprises two switches 16, 16' at the inputs to the optical modulators 15, 15; to permit the insertion of the signalling message parts into the digital bit streams carried in the two directions, two signalling transmission circuits 17, 17' conjointly controlling the two switches 16, 16', one circuit (17) permitting the insertion into the digital bit streams of a signalling message with terminal A as the processing terminal and the other circuit (17') permitting the insertion into the digital bit streams of a signalling message with terminal B as the processing terminal, and two alarm detection and management circuits 18, 18', one circuit (18) monitoring the circuits assigned to the transmission direction from A to B and controlling the signalling transmission circuit 17 and the other (18') monitoring the circuits assigned to the transmission direction from B to A and controlling the signalling transmission circuit 17'.

The switches 16, 16' have a first input connected to the output of the digital bit stream regeneration circuit 14, 14', a second input connected to the output of the signalling message transmission circuit 17, 17', an output connected to the input of the optical modulator 15, 15' and an addressing input 19, 19' driven simultaneously by the two signalling transmission circuits 17, 17' through two or gates 20, 20'.

The first input of the switches 16, 16' is selected by a logic zero and the second by a logic one on their addressing input 19, 19'.

The substitution for the data of a digital bit stream of a localizing part of a signalling message, that is to say a pattern of 75 consecutive zero bits, is achieved by means of the switch 16 or 16' through which the digital bit stream in question passes by maintaining on its second input logic zero and applying to its addressing input logic one for the duration of 75 consecutive bits, that is 0.25 μs.

Substituting for the data of a digital bit stream a characterizing part of a signalling message, that is a pattern of 150 consecutive bits comprising a first sequence of 75 consecutive bits all at one followed by another sequence of 75 consecutive bits all at one or all at zero, is also achieved by means of the switch 16 or 16' through which the digital bit stream in question passes, by applying to its addressing input logic one for the duration of 150 bits, that is 0.5 μs, and to its second input, as appropriate, either logic one maintained for the duration of 150 bits (0.5 μs) or logic one maintained for the duration of 75 bits (0.25 μs) then logic zero maintained for the same interval.

Figure 3:
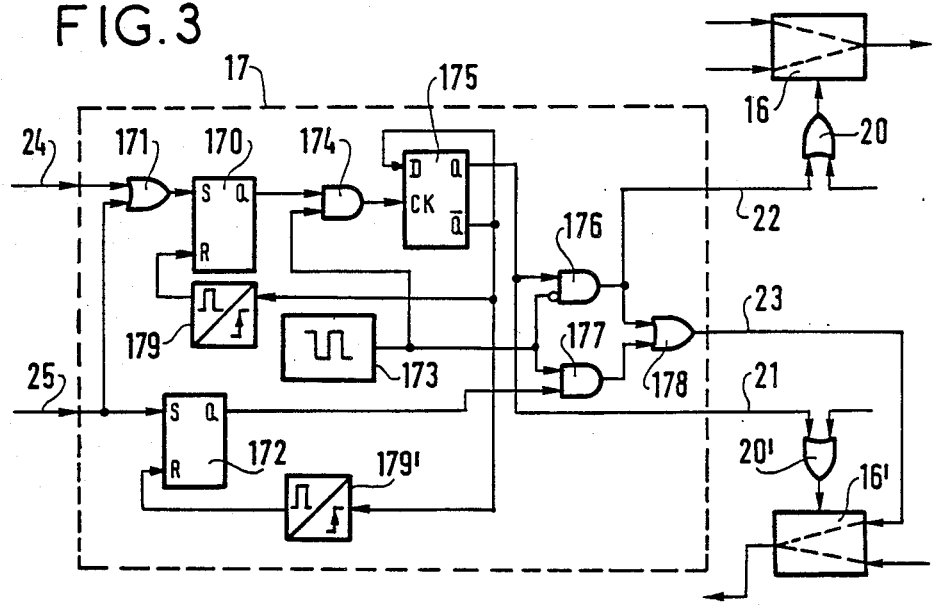
FIG. 3 is a block diagram of a signalling message transmission circuit.

The instructions controlling the switching to achieve these substitutions are generated by the signalling transmission circuits 17, 17'. FIG. 3 shows one embodiment of one of these, namely the circuit 17 generating the signalling messages for which the terminal TA is the processing terminal. The circuit comprises:

a clock circuit 173 delivering a symmetrical squarewave clock signal the period of which is equal to the duration of the characterizing part of a signalling message and the half-period of which is equal to the duration of the localizing part or of a prefix or suffix sequence of a characterizing part of a signalling message.

a circuit for selecting the first complete period of the signal from the clock circuit 173 following the transmission of an alarm by the alarm detection and management circuit 18, which comprises:

a first RS type flip-flop 170 with its S input connected by an OR gate 171 to the two outputs 24, 25 of the alarm detection and management circuit 18, an AND gate 174 with two inputs, one connected to the output of the clock circuit 173 and the other to the Q output of the first RS type flip-flop 170, and a D type flip-flop 175 triggered on falling edges clocked by the output signal of the AND gate 174, configured to divided by two and with its Q output connected to the R input of the first RS type flip-flop 170 through the intermediary of a positive transition detector 179 and its Q output connected to the output 21 of the signalling message transmission circuit controlling through the intermediary of the OR gate 20' the addressing input of the switch 16' inserted into the B to A direction of the link, a circuit for marking the first half of the period selected by the section circuit formed by an AND gate 176 with two inputs, one of which is preceded by an inverter connected to the output of the clock circuit 173 and the other of which is connected to the Q output of the D type flip-flop 175, and an output connected to the output 22 of the signalling transmission circuit controlling through the intermediary of the OR gate 20 the addressing input of the switch 16 inserted in the A to B direction of the link, and a circuit for composing the suffix sequence of a characterizing part of a signalling message, comprising:

a second RS type flip-flop 172 memorizing the type of alarm generated by the alarm detection and management circuit 18 with its S input connected to one of the outputs of this alarm detection and management circuit 18 and its R input connected to the Q output of the D type flip-flop 175 through the intermediary of a positive transition detector 179', an AND gate 177 with two inputs, one of which is connected to the output of the second RS type flip-flop 172 and the other of which is connected to the output of the clock circuit 173, and an OR gate 178 connected to the outputs of the AND gates 176, 177 and delivering the signal from the output 23 of the signalling transmission circuit applied to the second input of the switch 16' inserted into the B to A direction of the link.

The signalling transmission circuit has two inputs 24, 25 dedicated to each of the two types of alarm that the alarm detection and management circuit 18 controlling it can generate. When idle, that is in the absence of any alarm, these two inputs 24, 25 remain at logic zero as do the Q outputs of the three flip-flops 170, 172, 175 and the general outputs 21, 22, 23 which drive the switches 16, 16'. Because of the logic zero on the general outputs 21, 22 a regenerative repeater always has its switches set to their first inputs through which pass the digital bit streams when its two signalling transmission circuits are idle. Because of the logic zero on the general output 23 of an idle signalling transmission circuit, the other signalling transmission circuit can, as will be described later, generate the localizing part of its signalling message.

The appearance of a type of alarm is manifested by a pulse the duration of which is less than that of the characterizing part (0.5 μs) of a signalling message on one of the inputs 24, 25. This pulse triggers the RS flip-flop 170 whose Q output goes to logic one, unblocking the AND gate 174 and causing the clock signal to be applied to the clock input of the D type flip-flop 175. It triggers or does not trigger the RS flip-flop 172 depending on the input 25 or 24 on which it occurs, thus memorizing by the level at the Q output of this RS flip-flop 172 the type of alarm that it represents.

The D type flip-flop 175 selects the first complete period of the clock signal reaching it after the AND gate 174 is opened as the duration of the characterizing part of a signalling message. This selection is effected by the appearance of logic one on its Q output used as the general output 21 to operate the switch 16' so as to substitute a signalling message characterizing part for the digital bit stream conveyed by the link in the direction B to A. At the end of selection the positive transition appearing at the complemented $\overline{Q}$ output of the D type flip-flop 175 causes the RS flip-flops 170, 172 to be reset and consequently closes the AND gate 174, causing the D type flip-flop 175 to remain idle.

The AND gate 176 marks the first half of the period of the clock signal selected by the D type flip-flop 175 by logic one appearing at its output; firstly, it operates the switch 16 so as to substitute for the digital bit stream carried by the link in the direction A to B a logic zero from the other signalling message transmission circuit 17' assumed to be idle and corresponding to the consecutive zero bits of a localizing part of a signalling message and, secondly, by being applied to the second input of the switch 16', it causes transmission in the direction from B to A of the link of a logic one corresponding to the consecutive one bits of the prefix sequence of a characterizing part of a signalling message.

The AND gate 177 determines the logic level applied to the second input of the switch 16' during the second half of the period of the clock signal selected by the D type flip-flop 175 which corresponds to the period of sending the suffix sequence of a characterizing part of a signalling message. This logic one or zero is that from the Q output of the RS type flip-flop 172 which memorizes the type of alarm that gave rise to transmission of the signalling message and, depending on the alarm type, causes transmission in the direction B to A of the link of a suffix sequence of a signalling message characterizing part formed either by a sequence of consecutive one bits or by a sequence of consecutive zero bits.

The clock circuit 173 may be based either on a free-running oscillator or on dividers operating on the bit timing signal recovered from one of the two digital bit streams. It is not necessary for it to be synchronized on the transitions between the bits of the digital bit streams, the number of consecutive one or zero bits constituting the parts of a signalling message not being imperative but merely limited by a minimal value imposed by the detection circuits of the terminals and a maximal value imposed with a view to minimizing any possible disturbance of the digital bit streams.

Naturally, in each of the switching circuits 16, 16' a sampling flip-flop (not shown) clocked by the bit timing recovery circuit 13, 13' synchronizes the signal applied to the second input of this switching circuit 16, 16' with the bit timing of the corresponding digital bit stream.

It will be noted that only a very limited number of components require a very high speed technology compatible with the 295.600 Mbit/s data rate but featuring high energy consumption, virtually all of the circuits operating at a reduced data rate accessible with merely high speed technology and much more economical in energy use.

Figure 4:
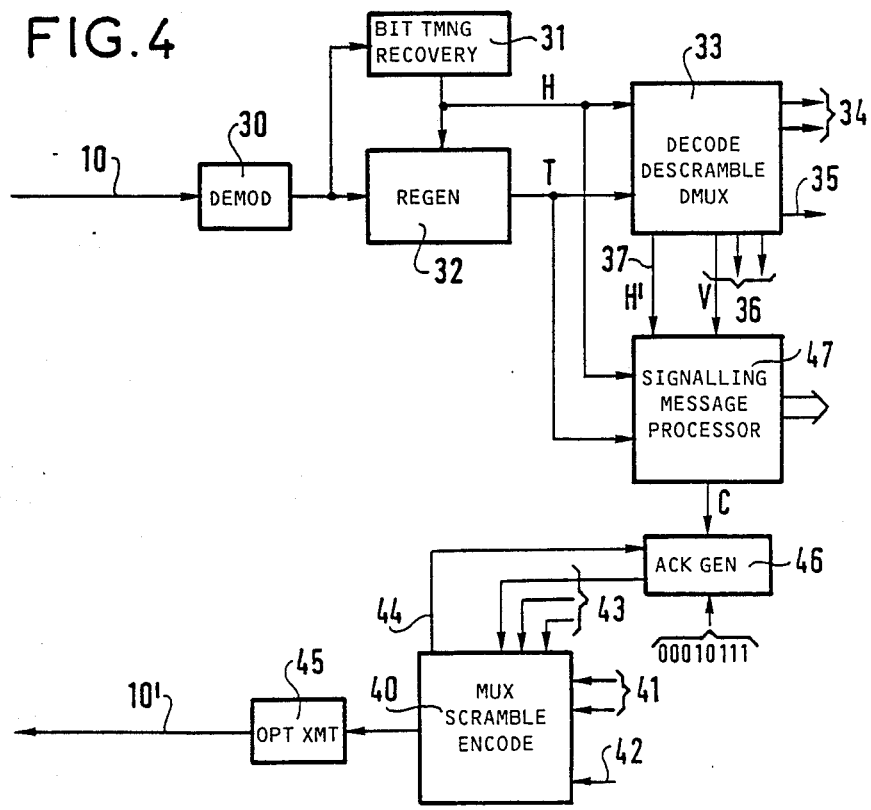
FIG. 4 is a schematic representation of the layout of signalling message processing equipment in a terminal.

FIG. 4 is a schematic representation in their environment of the circuits assigned to signalling in a terminal. This terminal, chosen arbitrarily, is the terminal TB. It has conventional receive and transmit parts between which is inserted a signalling message processing equipment 47 controlling an acknowledgement message M* generator 46.

The receive part includes an opto-electronic demodulator 30 at which terminates the optical fiber 10 of the upper transmission line carrying the incoming multiplex in the form of a digital bit stream at 295.6 Mbit/s, electronic circuits for reshaping the signal essentially comprising a bit timing recovery circuit 31 and a regenerator circuit 32, and a decoding, descrambling and demultiplexing equipment 33 which receives on its input the digital bit stream T at 295.6 MBit/s delivered by the regenerator circuit 32 and its recovered bit clock H and divides the incoming multiplex into its components, that is two digital bit streams at 140 Mbit/s that is delivers on its outputs 34 with their clock signal available on an output 35, and service channels at 64 kbit/s that is delivers to outputs 36 with their clock signal H' available on an output 37.

The transmit part has a multiplexing, scrambling and encoding equipment 40 which delivers a digital bit stream at 295.6 Mbit/s to be sent on line produced by scrambling and encoding an outgoing multiplex produced from two digital bit streams at 140 Mbit/s applied to inputs 41 and their timing signal applied to an input 42 and from service channels at 64 kbit/s which are applied to inputs 43 for which it supplies a timing signal available on an output 44. This multiplexing, scrambling and encoding equipment 40 is followed by an optical transmitter 45 which receives the digital bit stream at 295.6 Mbit/s in electrical form and inserts it in optical form into the optical fiber N' of the lower transmission line.

These transmit and receive parts will not be described in detail as they are well known to those skilled in the art and do not constitute part of the present invention.

One of the service channels of the incoming multiplex marked V at the outputs 36 of the decoding, descrambling and demultiplexing equipment is reserved for transmission of the acknowledgement messages from terminal TA to terminal TB.

One of the service channels of the outgoing multiplex is reserved for transmitting the acknowledgement messages from terminal TB to terminal TA. Its access among the inputs 43 of the multiplexing, scrambling and encoding equipment 40 is connected to the serial data output of an 8-stage shift register constituting the acknowledgement message M* generator 46. This shift register has a serial input (not shown) held at logic zero, a parallel input wired to the logic states 00010111 corresponding to the bytes defining an acknowledgement message, a clock input connected to the channel clock signal output 44 of the multiplexing, scrampling and encoding equipment 40, and a parallel loading control input driven by a signal C generated by the signalling message processing equipment.

The signalling message processing equipment 47 receives from the receive part the digital bit stream T at 295.6 Mbit/s of the incoming multiplex and its bit clock H, detecting in the latter the sequences of consecutive one or zero bits composing the signalling message parts and the incoming service channel V and its clock signal H' for detecting the acknowledgement messages.

It generates the signal C controlling the acknowledgement message M* generator for the signalling messages for which the terminal TB is the relay terminal and furnishes information relating to the signalling messages for which the terminal TB is the processing terminal, that is to say their type and the identity of their sender. Its composition is shown the detail in FIG. 5. It essentially comprises:

a circuit 50 for detecting sequences of consecutive one bits constituting the prefix or suffix sequences of the characterizing parts of signalling messages, a circuit 60 for detecting sequences of consecutive zero bits constituting the localizing parts of signalling messages or the suffix sequences of the characterizing parts of signalling messages, an acknowledgement message detector circuit 70, a timing marker circuit 80 which is triggered by the circuit 50 for detecting sequences of consecutive one bits and reset by the circuit 70 for detecting acknowledgement messages and which marks the time elapsed between receiving a characterizing part and an acknowledgement message, a timing circuit 90 measuring the duration of the pulse output by the timing marker circuit 80, a circuit 100 for identifying the signalling message type which is operative by sampling the output of the circuit 60 for detecting sequences of consecutive zero bits after each triggering of the timing marker circuit 80, a circuit 110 controlling the acknowledgement message generator activated by the circuit 60 for detecting sequences of consecutive zero bits in the absence of triggering of the timing marker circuit 80, and a sampling memory 120 which receives the output signals from the signalling message type identification circuit 100 and from the timing circuit 90 and which is written after each pulse generated by the timing marker circuit 80.

The circuit 50 for detecting sequences of consecutive one bits generates a positive pulse each time that it recognizes in the digital bit stream T a pattern having less than three zero bits in 75 consecutive bits and able to constitute a prefix or suffix sequence of type $\overline{M1}$ of a characterizing part of a signalling message. It comprises a counter 51 which counts the bits of the digital bit stream T at logic one and divides by 73, generating a positive pulse at the output of the detector 50 each time it overflows. This counter 51 is reset to zero by a counter 52 which counts the bits of the digital bit stream at logic zero and divides by three, generating a positive pulse at the output each time it overflows. The bits of the digital bit stream T at logic one are counted by means of an AND gate 53 with two inputs, one receiving the recovered bit clock H and the other receiving the digital bit stream T and transmitting to the count input of the counter 51 only the periods of the recovered bit block H that coincide with a bit of the digital bit stream at logic one. The bits of the digital bit stream at logic zero are counted by means of an AND gate 54 with two inputs, one receiving the recovered bit clock H and the other receiving the digital bit stream T previously inverted by an inverter, transmitting to the count input of the counter 52 only the periods of the recovered bit clock H that coincide with a bit of the digital bit stream T at logic zero. Each counter 51, 52 is systematically reset to zero each time is overflows by means of a time-delay circuit 55, 56 which loops its overflow output to its reset to zero input, directly in the case of the counter 52 and through the intermediary of an OR gate 57 in the case of counter 51.

The circuit for detecting sequences of consecutive zero bits generate a positive pulse each time it recognizes in the digital bit stream T a pattern featuring less than three bits at one in 75 consecutive bits and possibly constituting either a signalling message localizing part or a type M1 suffix sequence of a signalling message characterizing part. Its structure is analogous to that of the circuit 50 for detecting sequences of consecutive one bits except for the AND gate 53 which controls the count input of the counter 61, one input of which receives the recovered bit clock H and the other input of which receives the digital bit stream T previously inverted by an inverter, and except for the AND gate 64 which controls the count input of the counter 62 and of whose two inputs one receives the recovered bit clock H and the other the digital bit stream T.

The acknowledgement message detector circuit 70 generates a positive pulse each time that is recognizes the byte 00010111 that defines an acknowledgement message. It is based on an eight-stage shift register 71 with serial data input and parallel data output which receives on its serial data input the signal V from the service channel of the incoming multiplex reserved for transmission to terminal B of acknowledgement messages and on its clock input the clock signal H' associated with the service channels of the incoming multiplex and a comparator 72 for comparing two binary numbers each of eight digits, having one input wired to the logic levels 00010111 and the other input connected to the parallel data output of the shift register 71.

The timing marker circuit 80 comprises an RS type flip-flop 81 whose reset to one input is connected to the output of the circuit 50 for detecting sequences of consecutive one bits and whose reset to zero input R is connected to the output of the acknowledgement message detector circuit 70. The detector circuit 50 causes the output of this RS type flip-flop 81 to go to logic one each time that it detects in the digital bit stream T a sequence of 73 bits at one separated by less than three zero bits possibly constituting a type $\overline{M1}$ prefix or suffix sequence of a signalling message characterizing part whereas the detector circuit 70 resets the output of this RS type flip-flop 81 to logic zero each time an acknowledgement message is detected. A time-delay circuit 82 with a time-delay Δ' greater than the maximum time taken by an acknowledgement message to reach the terminal TB after a signalling message characterizing part loops the output of the RS type flip-flop 81 to its R input through the intermediary of an OR gate 83 and systematically causes resetting to zero of the RS type flip-flop 81 in the event of false triggering.

The circuit 100 for identifying the signalling message type identifies the type M1 or $\overline{M1}$ of the suffix sequence of a signalling message characterizing part by memorizing a possible positive pulse generated by the circuit 64 detecting sequences of consecutive zero bits over a certain time period after each transmission of a positive pulse by the circuit 50 for detecting sequences of consecutive one bits. It comprises:

a monostable 101 triggered by the positive transitions in the output circuit of the circuit 50 for detecting sequences of consecutive one bits and which generates a negative 420 ns pulse constituting a sampling window defining the period of time during which is memorized any pulse at the output of the circuit 64 detecting sequences of consecutive zero bits, a sampling gate formed by an AND gate 102 with two inputs, one of which is preceded by an inverter and connected to the output of the monostable 101 and the other of which is connected directly to the output of the circuit 64 detecting sequences of consecutive zero bits, a monostable 103 which is triggered by the rising edges of the signal delivered by the sampling gate 102 and generates a 200 ns positive pulse indicating recognition of a type M1 suffix sequence of a signalling message characterizing parts, and a rising edge triggered D type flip-flop 104 receiving on its clock input the negative pulse from the monostable 101 constituting the sampling window and on its data input the positive pulse if any from the monostable 103 characterizing the recognition of a type M1 suffix part.

The circuit 110 controlling the acknowledgement message generator operates in the event of reception of a signalling message localizing part, that is to say in the event of reception of a sequence of consecutive zero bits not following on from a sequence of consecutive one bits. It comprises a monostable 111 which generates a positive pulse and which is triggered by the rising edges of the output signal from the circuit 60 for detecting sequences of consecutive zero bits in the absence of previous triggering of the circuit 50 for detecting sequences of consecutive one bits by virtue of an AND gate 112 with two inputs of which one is connected to the output of the monostable 101 of the identification circuit 100 and the other is connected to the output of the detector circuit 60.

The timing circuit 90 measures the duration of the positive pulse generated by the timing marker circuit 80. It comprises a counter 91 which counts the periods of a clock signal H" during each positive pulse generated by the timing marker circuit 80. The periods of the clock signal H" coinciding with a positive pulse from the timing marker circuit 80 are selected by means of an AND gate 92 with two inputs of which one receives the clock signal H" and the other the output signal from the timing marker circuit 80. A first monostable 93 triggered by the falling edges of the positive pulses delivered by the timing marker circuit 80 generates a 1 μs negative pulse used to control writing of the sampling memory 120 at the end of each of these pulses. A second monostable 94 on the output side of the first and triggered by the rising edges of the negative write pulses delivered by the latter generates 1 μs negative pulses used to reset to zero the counter 91 at the end of each positive pulse generated by the timing marker circuit 80 and after writing of its content into the sampling memory 120.

The sampling memory 120 is written after each positive pulse generated by the timing marker circuit 80, on the one hand with the content of the D type register 104 of the identification circuit 100 which corresponds to the signalling message type, logic zero corresponding to a signalling message having a characterizing part with a type M1 suffix sequence and logic one to a signalling message having a characterizing part with a type $\overline{M1}$ suffix sequence, and on the other hand with the content of the counter 91 which measures the duration separating at the terminal TB reception of a signalling message characterizing part from reception of an acknowledgement message, this duration indicating the rank of the transmitting regenerative repeater relative to the terminal TA and in consequence identifying the repeater.

The signalling message processing equipment comprises a number of circuits operating at high data rates necessitating a very high speed technology with very high energy consumption. This is of no importance since the signalling system is used on only a limited number of equipments on a digital link, generally speaking without remote power feed.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. A method for transmitting signalling in a digital transmission system including a processing terminal linked with a relay terminal via a digital transmission link and at least one intermediate regenerative repeater connected in said digital transmission link, data messages being transmitted between said processing and relay terminal via said digital transmission link and said at least one intermediate regenerative repeater, said digital transmission link comprising a first direction link and a second directional link, comprising the steps of:

at one said intermediate regenerative repeater, temporarily substituting for data in a digital bit stream carried on said transmission link signalling messages comprising a localizing part and a characterizing part, said characterizing part being transmitted on said second directional link in a direction of said processing terminal and said localizing part being transmitted on said first directional link in a direction of said relay;

at said relay terminal, transmitting to said processing terminal via said second directional link and said at least one intermediate regenerative repeater an acknowledgement message of different form than said characterizing part upon receipt of said localizing part of said signalling messages on said first directional link; and at said processing terminal, receiving on said second direction link said characterizing part of said signalling messages and said acknowledgement message, and determining a position of said regenerative repeater along said digital transmission link by determining a difference in arrival times between said characterizing part of said signalling messages and said acknowledgement message.

2. A device for transmitting signalling via a digital transmission system including a processing terminal linked with a relay terminal via a digital transmission link of a first and a second directional link and at least one intermediate regenerative repeater connected in said digital transmission link, data messages being transmitted between said processing and relay terminals via said digital transmission link and said at least one intermediate regenerative repeater, wherein the improvement comprises:

said intermediate regenerative repeater comprising means for temporarily substituting for at least one of said data messages signalling messages comprising a localizing part and a characterizing part, said characterizing part being transmitted on said second directional link in a direction of said processing terminal and said localizing part being transmitted on said first directional link in a direction of said relay terminal;

said relay terminal comprising means for transmitting to said processing terminal via said second directional link and said at least one intermediate regenerative repeater an acknowledgement message of different form than said characterizing part upon receipt of said localizing part of said signalling messages; and said processing terminal comprising means for receiving on said second directional link said characterizing part of said signalling messages and said acknowledgement message, and means for determining the position of said regenerative repeater along said digital transmission link by determining a difference in arrival times between said characterizing part of said signalling messages and said acknowledgement message.

3. A method for transmitting signalling in a digital transmission system including a processing terminal linked with a relay terminal via a digital transmission link and at least one intermediate regenerative repeater connected in said digital transmission link, data messages being transmitted between said processing and relay terminal via said digital transmission link and said at least one intermediate regenerative repeater, said link comprising a first directional link and a second directional link, comprising the steps of:

at one said intermediate regenerative repeater, temporarily substituting for data in a digital bit stream carried on said digital transmission link signalling messages comprising a localizing part and a characterizing part, said characterizing part being transmitted on said second directional link in a direction of said processing terminal and said localizing part being transmitted on said first directional link in a direction of said relay terminal;

at said relay terminal, transmitting to said processing terminal via said second directional link and said at least one intermediate regenerative repeater an acknowledgement message upon receipt of said localizing part of said signalling messages on said first directional link; and at said processing terminal, receiving on said second directional link said characterizing part of said signalling messages and said acknowledgement message, and determining a position of said intermediate regenerative repeater along said digital transmission link by determining a difference in arrival times between said characterizing part of said signalling messages and said acknowledgement message;

wherein the characterizing part of said signalling messages comprises a plurality of bit patterns which all begin with an invariant prefix sequence and continue with a suffix sequence specific to each type of said messages;

wherein the characterizing part of said signalling messages comprises one of two distinct bit patterns, depending on the type of message, each of the two bit patterns comprising a prefix sequence obtained by complementing the bit pattern adopted for the localizing part of said signalling messages and a suffix sequence identical to the prefix sequence for one of the two patterns and to the complement of the prefix sequence for the other of the two patterns.

4. A device for transmitting signalling via a digital transmission system including a processing terminal linked with a relay terminal via a digital transmission link of a first and a second directional link and at least one intermediate regenerative repeater connected in said digital transmission link, data messages being transmitted between said processing and relay terminals via said digital transmission link and said at least one intermediate regenerative repeater, wherein the improvement comprises:

said intermediate regenerative repeater comprising means for temporarily substituting for at least one of said data messages signalling messages comprising a localizing part and a characterizing part, said characterizing part being transmitted on said second directional link in a direction of said processing terminal and said localizing part being transmitted on said first directional link in a direction of said relay terminal;

said relay terminal comprising means for transmitting to said processing terminal via said second directional link and said at least one intermediate regenerative repeater an acknowledgement message upon receipt of said localizing part of said signalling messages; and said processing terminal comprising means for receiving an said second directional link said characterizing part of said signalling messages and said acknowledgement message, and means for determining the position of said intermediate regenerative repeater along said digital transmission link by determining a difference in arrival times between said characterizing part of said signalling messages and said acknowledgement message;

wherein said intermediate regenerative repeater comprises:

an alarm detection and management circuit for generating two types of alarms;

two switching circuits, one for each transmission direction, for substituting for ordinary messages in digital bit streams on said digital transmission link said localizing and characterizing parts of said signalling messages; and at least one signalling message transmission circuit for controlling said switching circuits under the control of said alarm detection and management circuit;

wherein said signalling message transmission circuit comprises:

a clock circuit delivering a clock signal having a period, said period being equal to a duration of said characterizing part of said signalling messages, a half of said period being equal to one of a duration of said localizing part of said signalling messages, of a duration of a suffix sequence of said characterizing part of said signalling messages, and of a duration of a prefix sequence of said characterizing part of said signalling messages;

a circuit for selecting a first complete period of a signal generated by said clock circuit after transmission of an alarm by said alarm detection and management circuit, said selection circuit controlling a first one of said switching circuits for replacing data in said digital bit stream in one direction with said characterizing part of said signalling messages;

a circuit for marking a first half-period of a period selected by said selection circuit and controlling during said first half-period a second of said switching circuits for replacing data in said digital bit stream in a direction opposite said first-mentioned direction by said localizing part of said signalling messages consisting of a constant first logic level and applying to an input of said first of said switching circuits a second constant logic level corresponding to a prefix sequence of said characterizing part of said signalling messages; and a circuit for composing suffix sequences of said characterizing part of said signalling messages, storing a type of alarm sent by said alarm detection and management circuit, and applying to said input of said first of said switching circuits during a duration of a suffix sequence a constant logic level dependent on a type of said alarm.

5. The device according to claim 4, wherein at least one of said relay terminal and said processing terminal comprises an acknowledgement message generator for inserting acknowledgement messages into an outgoing bit stream therefrom, and signalling message processing equipment comprising:

a circuit for detecting sequences of consecutive bits at said second logic level corresponding to a prefix or suffix sequence of said characterizing part of said signalling messages, said detected sequences being disposed in a digital bit stream coming into said detecting circuit;

a circuit for detecting in an incoming digital bit stream sequences of consecutive bits at said first logic level corresponding to one of said localizing part and a suffix sequence of said characterizing part of said signalling messages;

a circuit for detecting an acknowledgement message arriving in said incoming digital bit stream;

a timing marker circuit triggered by said circuit for detecting sequences of consecutive bits at said second logic level and reset to zero by said acknowledgement message detector circuit;

a timing circuit for measuring a duration of pulses generated by said timing marker circuit;

a circuit for identifying a type of said signalling messages by sampling an output of one of said circuits for detecting consecutive bits at said first and second logic levels after each triggering of said timing marker circuit;

a circuit for controlling said acknowledgement message generator activated by said circuit for detecting sequences of consecutive bits at said first logic level in the absence of triggering of said timing marker circuit; and a sampling memory into which is written after each pulse generated by said timing marker circuit output signals of said timing circuit and said identification circuit.

6. The device according to claim 5, comprising:

a first terminal including one said relay terminal, one said processing terminal, said acknowledgement message generator and said signalling message processing equipment; and a second terminal linked to said first terminal via said digital transmission link and including at least one of one said relay terminal and one said processing terminal.

* * * * *